United States Patent
Tsai et al.

(10) Patent No.: US 12,011,809 B2
(45) Date of Patent: Jun. 18, 2024

(54) POWER TOOL AND SAFETY CONTROL CIRCUIT MODULE AND SAFETY CONTROL METHOD THEREOF

(71) Applicant: BASSO INDUSTRY CORP., Taichung (TW)

(72) Inventors: Cheng-en Tsai, Taichung (TW); Chun-min Shih, Taichung (TW); Chong-kun Hung, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 340 days.

(21) Appl. No.: 17/652,064

(22) Filed: Feb. 22, 2022

(65) Prior Publication Data

US 2022/0314407 A1     Oct. 6, 2022

(30) Foreign Application Priority Data

Mar. 31, 2021   (TW) .................... 110112010

(51) Int. Cl.
*B23Q 11/00*      (2006.01)
*B25B 23/147*     (2006.01)
(Continued)

(52) U.S. Cl.
CPC ........ *B25B 23/147* (2013.01); *B23Q 11/0085* (2013.01); *B25D 16/006* (2013.01);
(Continued)

(58) Field of Classification Search
CPC ........ B60K 6/547; B60K 17/28; B25B 23/47; B23Q 11/0085; H02K 11/21; H02K 11/33
See application file for complete search history.

(56) References Cited

U.S. PATENT DOCUMENTS 5,467,242 A    11/1995   Kiraly
2004/0120090 A1   6/2004   Galli et al.
(Continued)

FOREIGN PATENT DOCUMENTS

CN      201214236 Y    4/2009
TW      201834378 A    9/2018
(Continued)

OTHER PUBLICATIONS

MC33153 Single IGBT Gate Driver, Aug. 31, 2013.
Europe Search Report in Europe application No. 22161408.4, mailed on Sep. 7, 2022.

*Primary Examiner* — Erick D Glass
(74) *Attorney, Agent, or Firm* — PV IP PC; Wei Te Chung; Zhigang Ma

(57) ABSTRACT

A power tool and a safety control circuit module and a safety control method thereof are provided. The power tool includes a power supply device, a control processing device, a safety control circuit module, and a power output device. The control processing device is electrically connected with the power supply device. The safety control circuit module includes a first switch control circuit, a second switch control circuit, a third switch control circuit, a first resistor, and a first diode. The power output device includes a first power connection terminal and a second power connection terminal. Before switch units of the control circuits are controlled, the control processing device detects whether the switch unit has failed, so as to increase safety.

14 Claims, 5 Drawing Sheets

(51) Int. Cl.
*B25D 16/00* (2006.01)
*H02K 7/14* (2006.01)
*H02K 11/21* (2016.01)
*H02K 11/33* (2016.01)

(52) U.S. Cl.
CPC ............ *H02K 7/145* (2013.01); *H02K 11/21* (2016.01); *H02K 11/33* (2016.01); *B25D 2216/0084* (2013.01); *B25D 2250/195* (2013.01)

(56) References Cited

U.S. PATENT DOCUMENTS

| | | | |
|---|---|---|---|
| 2007/0177325 A1* | 8/2007 | Zandonella Balco | H02H 3/335 361/118 |
| 2009/0236012 A1* | 9/2009 | Gass | B23Q 11/0092 318/446 |
| 2012/0079799 A1 | 4/2012 | Matsunaga et al. | |
| 2015/0335212 A1 | 11/2015 | Brannan, Jr. et al. | |
| 2020/0158284 A1* | 5/2020 | Lewis | H02K 11/28 |
| 2021/0078153 A1 | 3/2021 | Sunabe et al. | |

FOREIGN PATENT DOCUMENTS

| | | |
|---|---|---|
| TW | 201843018 A | 12/2018 |
| TW | 202107821 A | 2/2021 |

\* cited by examiner

POWER TOOL AND SAFETY CONTROL CIRCUIT MODULE AND SAFETY CONTROL METHOD THEREOF

CROSS REFERENCE TO RELATED APPLICATIONS

The present application claims the priority of Taiwan Patent Application NO. 110112010, filed on Mar. 31, 2021, titled "POWER TOOL AND SAFETY CONTROL CIRCUIT MODULE AND SAFETY CONTROL METHOD THEREOF" and the disclosure of which is incorporated herein by reference.

BACKGROUND OF INVENTION

Field of Invention

The present invention relates to a power tool, and a safety control circuit module and a safety control method thereof, and especially to a power tool and a safety control circuit module which can detect whether a circuit has failed before a motor is turned on.

Description of Prior Art

In general power tools with motors, most of them do not have a function of detecting whether circuits have failed before the motors are turned on. For example, in some power tools, several transistors, such as metal-oxide-semiconductor field-effect transistors, are used to control electric current flowing through the motors. However, in a situation where the transistor is damaged, because there is no pre-detection mechanism, this can cause the motor to fail to shut down and continue operating, causing danger.

Furthermore, due to unpredictable working environment of the power tools, internal circuits of the power tools may be damaged due to static electricity or other reasons. If the power tools are used in a situation that the circuits are damaged, but no abnormality is detected, it can cause control abnormality and thus causes danger. Therefore, a power tool, and a safety control circuit module and a safety control method thereof are needed to relieve the aforesaid problem.

SUMMARY OF INVENTION

In order to solve the aforesaid problem, the power tool, and the safety control circuit module and the safety control method thereof provided by the present invention can prevent a phenomenon that a motor of the power output device keeps running after any switch unit is burned out but the control processing device cannot control it. In the present invention, before the switch unit is controlled, the control processing device is used to detect whether the switch unit has been failed, so that safety can be improved.

On the basis of the aforesaid purpose, the present invention provides a power tool including a power supply device, a control processing device, a safety control circuit module, and a power output device. The control processing device is electrically connected to the power supply device and includes a first switch signal output pin, a second switch signal output pin, third switch signal output pin, and an examination signal input pin. A first switch signal, a second switch signal, and a third switch signal are respectively outputted from the control processing device by the first switch signal output pin, the second switch signal output pin, and the third switch signal output pin. The safety control circuit module includes a first switch control circuit, a second switch control circuit, a third switch control circuit, a first resistor, and a first diode. The first switch control circuit is electrically connected to the first switch signal output pin. The second switch control circuit is electrically connected to the second switch signal output pin and the first switch control circuit. The third switch control circuit is electrically connected to the third switch signal output pin and the second switch control circuit. The first resistor is electrically connected to the power supply device. The first diode is electrically connected to the examination signal input pin and the first resistor. The power output device includes a first power connection terminal and a second power connection terminal. The first power connection terminal is electrically connected to the first switch control circuit, the first diode, and the second switch control circuit. The second power connection terminal is electrically connected to the third switch control circuit.

Preferably, the first switch control circuit includes a first driving circuit and a first switch unit. The second switch control circuit includes a second driving circuit and a second switch unit. The third switch control circuit includes a third driving circuit and a third switch unit. The first switch unit, the second switch unit, and the third switch unit are metal-oxide-semiconductor field-effect transistors. The first switch control circuit includes a first gate electrode, a first source electrode, and a first drain electrode. The second switch control circuit includes a second gate electrode, a second source electrode, and a second drain electrode. The third switch control circuit includes a third gate electrode, a third source electrode, and a third drain electrode. The first drain electrode is electrically connected to the power supply device. The first source electrode is electrically connected to the second drain electrode and the first power connection terminal. The second source electrode is electrically connected to the third source electrode. The third drain electrode is electrically connected to the second power connection terminal. The first driving circuit is electrically connected to the first gate electrode and the first switch signal output pin and receives the first switch signal to allow the first switch unit to be turned on. The second driving circuit is electrically connected to the second gate electrode and the second switch signal output pin and receives the second switch signal to allow the second switch unit to be turned on. The third driving circuit is electrically connected to the third gate electrode and the third switch signal output pin and receives the third switch signal to allow the third switch unit to be turned on. The first diode includes a first anode and a first cathode, and the first anode is electrically connected to the examination signal input pin and the first resistor. The first cathode is electrically connected to the first source electrode and the second drain electrode.

Preferably, the safety control circuit module further includes a second diode. The second diode includes a second anode and a second cathode. The second cathode is electrically connected to the first source electrode and the first power connection terminal. The second anode is electrically connected to the third drain electrode and the second power connection terminal.

Preferably, when the first switch signal, the second switch signal, and the third switch signal are not outputted by the control processing device through the first switch signal output pin, the second switch signal output pin, and the third switch signal output pin, the first switch unit, the second switch unit, and the third switch unit are not turned on, and an examination signal is received by the examination signal input pin.

Preferably, when the first switch signal, the second switch signal, and the third switch signal are not outputted by the control processing device through the first switch signal output pin, the second switch signal output pin, and the third switch signal output pin, but the second switch unit or the third switch unit is turned on, an abnormal signal having an electric potential lower than the examination signal is received by the examination signal input pin.

Preferably, the power supply device provides electric energy to the control processing device and the power output device. When the first switch unit and the third switch unit are turned on, an electric current of the electric energy flows from the first switch unit to the third switch unit through the power output device, and a motor of the power output device operates. When the motor operates, if the second switch unit and the third switch unit are turned on, and the first switch unit is not turned on, a braking current of a counter electromotive force generated during operation of the motor flows from the third switch unit to the second switch unit through the power output device, and the motor is decelerated. A turned-on time of the second switch unit and the third switch unit is determined by the second switch signal and the third switch signal sent from the control processing device.

Preferably, the control processing device further includes a plurality of detection pins, and each of the detection pins is electrically connected to a plurality of detection units respectively.

Preferably, the power tool can further include a motor detection circuit. One terminal of the motor detection circuit is electrically connected to the second switch control circuit and the third switch control circuit, and another terminal of the motor detection circuit is electrically connected to one of the plurality of detection pins.

Preferably, the plurality of detection units includes a trigger switch and a safety switch.

On the basis of the aforesaid purpose, the present invention further provides a safety control circuit module disposed in the power tool. The safety control circuit module includes a first switch control circuit, a second switch control circuit, a third switch control circuit, a first resistor, and a first diode. The first switch control circuit is electrically connected to a first switch signal output pin of a control processing device of the power tool and receives a first switch signal from the control processing device. A second switch control circuit is electrically connected to a second switch signal output pin of the control processing device and the first switch control circuit and receives a second switch signal from the control processing device. A third switch control circuit is electrically connected to a third switch signal output pin of the control processing device and the second switch control circuit and receives a third switch signal from the control processing device. The first resistor is electrically connected to a power supply device of the power tool. The first diode is electrically connected to an examination signal input pin of the control processing device and the first resistor, Furthermore, the safety control circuit module is connected to a power output device of the power tool, and the power output device includes a first power connection terminal and a second power connection terminal. The first power connection terminal is electrically connected to the first switch control circuit, the first diode, and the second switch control circuit. The second power connection terminal is electrically connected to the third switch control circuit.

Preferably, the first switch control circuit includes a first driving circuit and a first switch unit. The second switch control circuit includes a second driving circuit and a second switch unit. The third switch control circuit includes a third driving circuit and a third switch unit. The first switch unit, the second switch unit, and the third switch unit are metal-oxide-semiconductor field-effect transistors. The first switch control circuit includes a first gate electrode, a first source electrode, and a first drain electrode. The second switch control circuit includes a second gate electrode, a second source electrode, and a second drain electrode. The third switch control circuit includes a third gate electrode, a third source electrode, and a third drain electrode. The first drain electrode is electrically connected to the power supply device. The first source electrode is electrically connected to the second drain electrode and the first power connection terminal. The second source electrode is electrically connected to the third source electrode. The third drain electrode is electrically connected to the second power connection terminal. The first driving circuit is electrically connected to the first gate electrode and the first switch signal output pin and receives the first switch signal to allow the first switch unit to be turned on. The second driving circuit is electrically connected to the second gate electrode and the second switch signal output pin and receives the second switch signal to allow the second switch unit to be turned on. The third driving circuit is electrically connected to the third gate electrode and the third switch signal output pin and receives the third switch signal to allow the third switch unit to be turned on. The first diode includes a first anode and a first cathode. The first anode is electrically connected to the examination signal input pin and the first resistor, and the first cathode is electrically connected to the first source electrode and the second drain electrode.

Preferably, the safety control circuit module further includes a second diode. The second diode includes a second anode and a second cathode. The second cathode is electrically connected to the first source electrode and the first power connection terminal. The second anode is electrically connected to the third drain electrode and the second power connection terminal.

Preferably, when the first switch signal, the second switch signal, and the third switch signal are not outputted by the control processing device through the first switch signal output pin, the second switch signal output pin, and the third switch signal output pin, the first switch unit, the second switch unit, and the third switch unit are not turned on, and an examination signal having a high electric potential is received by the examination signal input pin; when the first switch signal, the second switch signal, and the third switch signal are not outputted by the control processing device through the first switch signal output pin, the second switch signal output pin, and the third switch signal output pin, but the second switch unit or the third switch unit is turned on, an abnormal signal having an electric potential lower than the examination signal is received by the examination signal input pin.

On the basis of the aforesaid, the present invention further provides a safety control method of the power tool, including:

providing electric energy to actuate a control processing device by a power supply device;

detecting states of a trigger switch and a safety switch by the control processing device, wherein if the control processing device detects that the safety switch and the trigger switch are in an actuation state and if the safety switch is actuated first corresponding to the trigger switch, the safety control method further includes:

making the first switch control circuit to be invalid by the control processing device, wherein the electric energy is unable to be transmitted to a second switch control circuit, a third switch control circuit, and a power output device at this time; and making the second switch control circuit and the third switch control circuit to be invalid by the control processing device; and detecting an electric potential of the second switch control circuit and the third switch control circuit by a detecting signal input pin.

If the electric potential is a low electric potential, the control processing device determines that at least one of the second switch control circuit and the third switch control circuit is failed and does not allow the electric energy of the power supply device to be transmitted to the power output device.

DETAILED DESCRIPTION OF EMBODIMENTS

Figure 1:
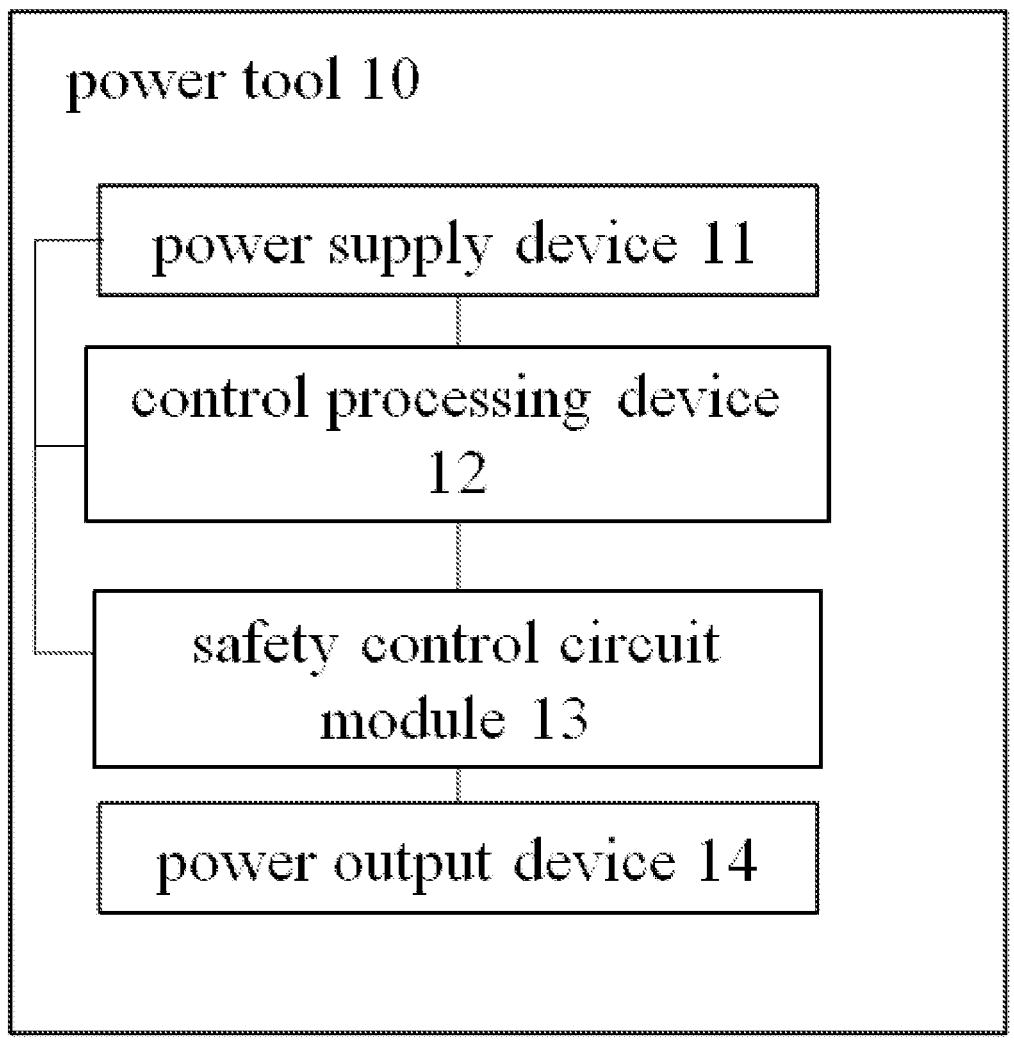
FIG. 1 is a first schematic diagram of a power tool and a safety control circuit module thereof according to one embodiment of the present invention.

To facilitate the review of the technique features, contents, advantages, and achievable effects of the present invention, the embodiments together with the attached drawings are described below in detail. However, the drawings are used for the purpose of indicating and supporting the specification, which may not depict the real proportion of elements and precise configuration in the implementation of the present invention. Therefore, the depicted proportion and configuration of the attached drawings should not be interpreted to limit the scope of implementation of the present invention.

The embodiments of the power tool and the safety control circuit module thereof in the present invention are explained with reference to the related figures. For ease of understanding, the same elements in the following embodiments are explained in accordance with the same symbols.

As illustrated in FIG. 1 to FIG. 5, the power tool 10 of the present invention includes a power supply device 11, a control processing device 12, a safety control circuit module 13, and a power output device 14. In one embodiment, the power tool 10 of the present invention can be an electric nail gun, but is not limited thereto. As long as the power tools that can use the technology provided by the present invention should be included in the scope of the present invention. The power tool 10 of the present invention is described in detail as follows.

The power supply device 11 includes a battery 111, a power supply switch 112, and a voltage regulator 113. The battery 111 is electrically connected to the power supply switch 112. The power supply switch 112 is electrically connected to the voltage regulator 113. The voltage regulator 113 is electrically connected to the control processing device 12 to provide a stable voltage to the control processing device 12. The power supply switch 112 is electrically connected to one of a plurality of function output pins of the control processing device 12 to accept control from the control processing device 12.

The control processing device 12 is electrically connected to the power supply device 11 and includes a first switch signal output pin 121, a second switch signal output pin 122, a third switch signal output pin 123, and an examination signal input pin 124.

In one embodiment, a first switch signal, a second switch signal, and a third switch signal are respectively outputted from the control processing device 12 by the first switch signal output pin 121, the second switch signal output pin 122, and the third switch signal output pin 123.

The safety control circuit module 13 includes a first switch control circuit 131, a second switch control circuit 132, a third switch control circuit 133, a first resistor 134, and a first diode 135. The first switch control circuit 131 is electrically connected to the first switch signal output pin 121. The second switch control circuit 132 is electrically connected to the second switch signal output pin 122 and the first switch control circuit 131. The third switch control circuit 133 is electrically connected to the third switch signal output pin 123 and the second switch control circuit 132. The first resistor 134 is electrically connected to the power supply device 11. The first diode 135 is electrically connected to the examination signal input pin 124 and the first resistor 134.

The power output device 14 includes a first power connection terminal 141 and a second power connection terminal 142. The first power connection terminal 141 is electrically connected to the first switch control circuit 131, the first diode 135, and the second switch control circuit 132. The second power connection terminal 142 is electrically connected to the third switch control circuit 133.

Furthermore, in one embodiment, the first switch control circuit 131 includes a first driving circuit 1311 and a first switch unit 1312; the second switch control circuit 132 includes a second driving circuit 1321 and a second switch unit 1322; and the third switch control circuit 133 includes a third driving circuit 1331 and a third switch unit 1332.

In one embodiment, the first switch unit 1312, the second switch unit 1322, and the third switch unit 1332 are metal-oxide-semiconductor field-effect transistors, and preferably, they can be N-type metal-oxide-semiconductor field-effect transistors.

Figure 2:
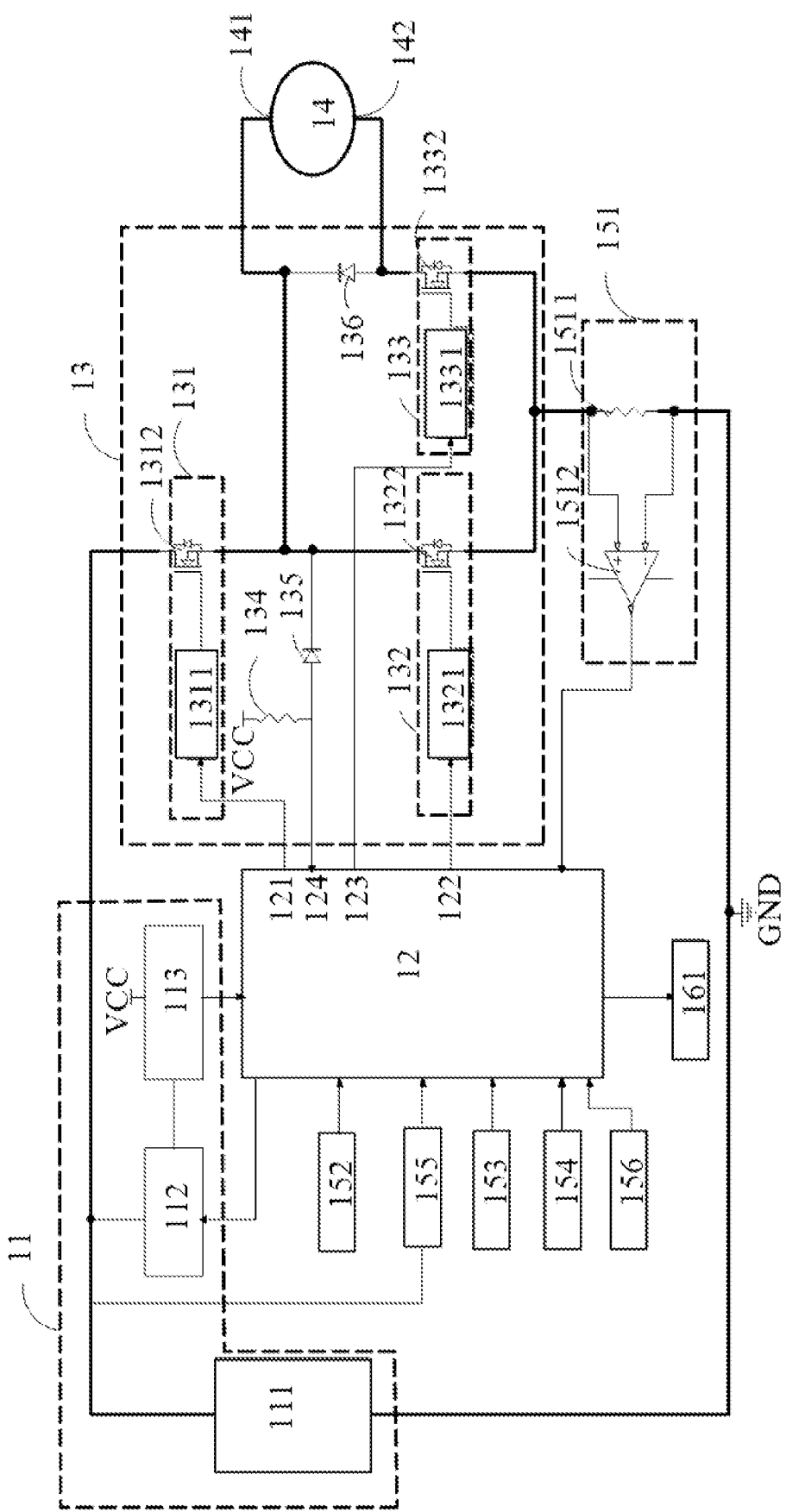
FIG. 2 is a second schematic diagram of the power tool and the safety control circuit module thereof according to one embodiment of the present invention.
Figure 3:
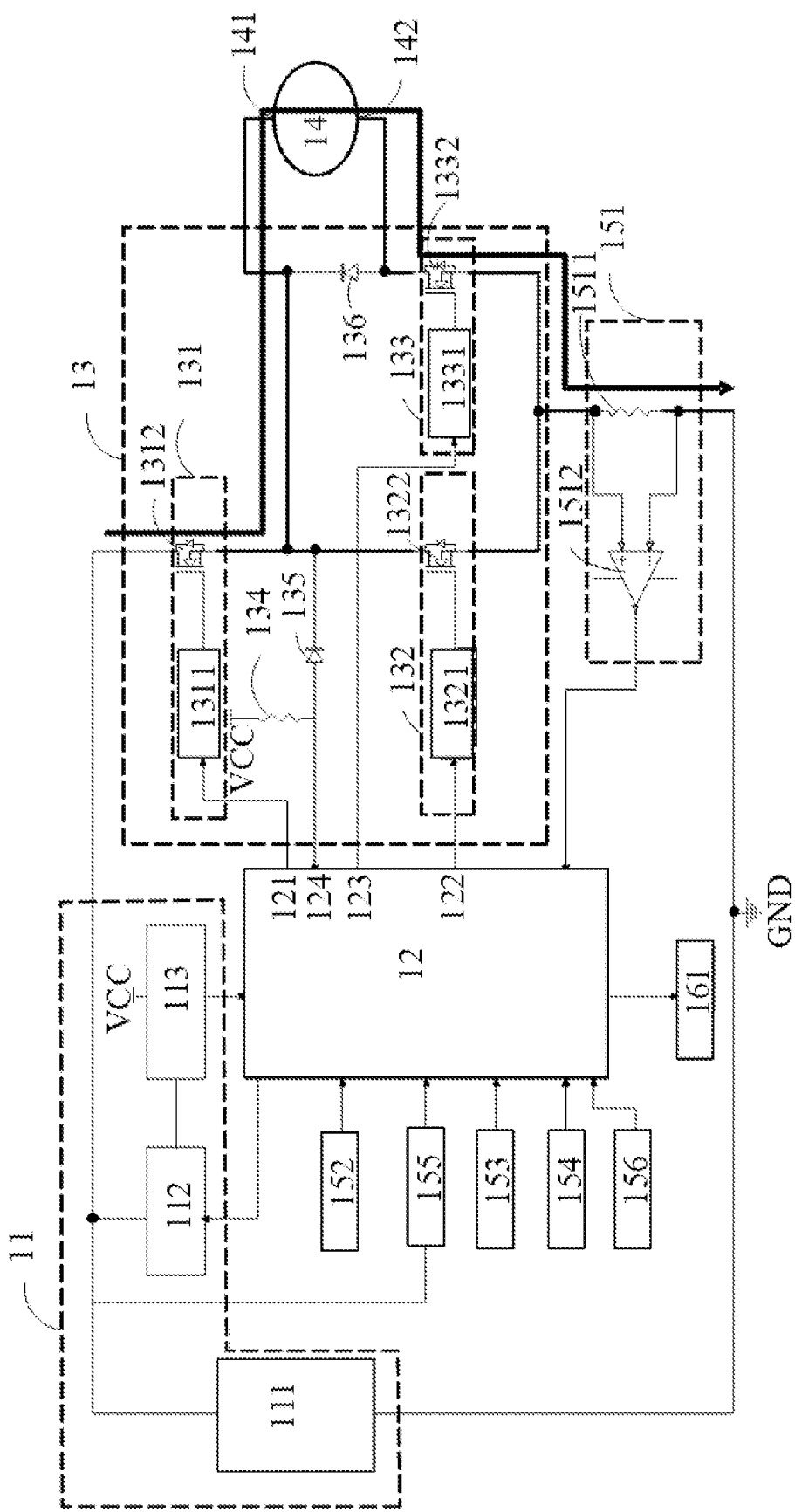
FIG. 3 is a first implementation schematic diagram of the power tool and the safety control circuit module thereof according to one embodiment of the present invention.
Figure 4:
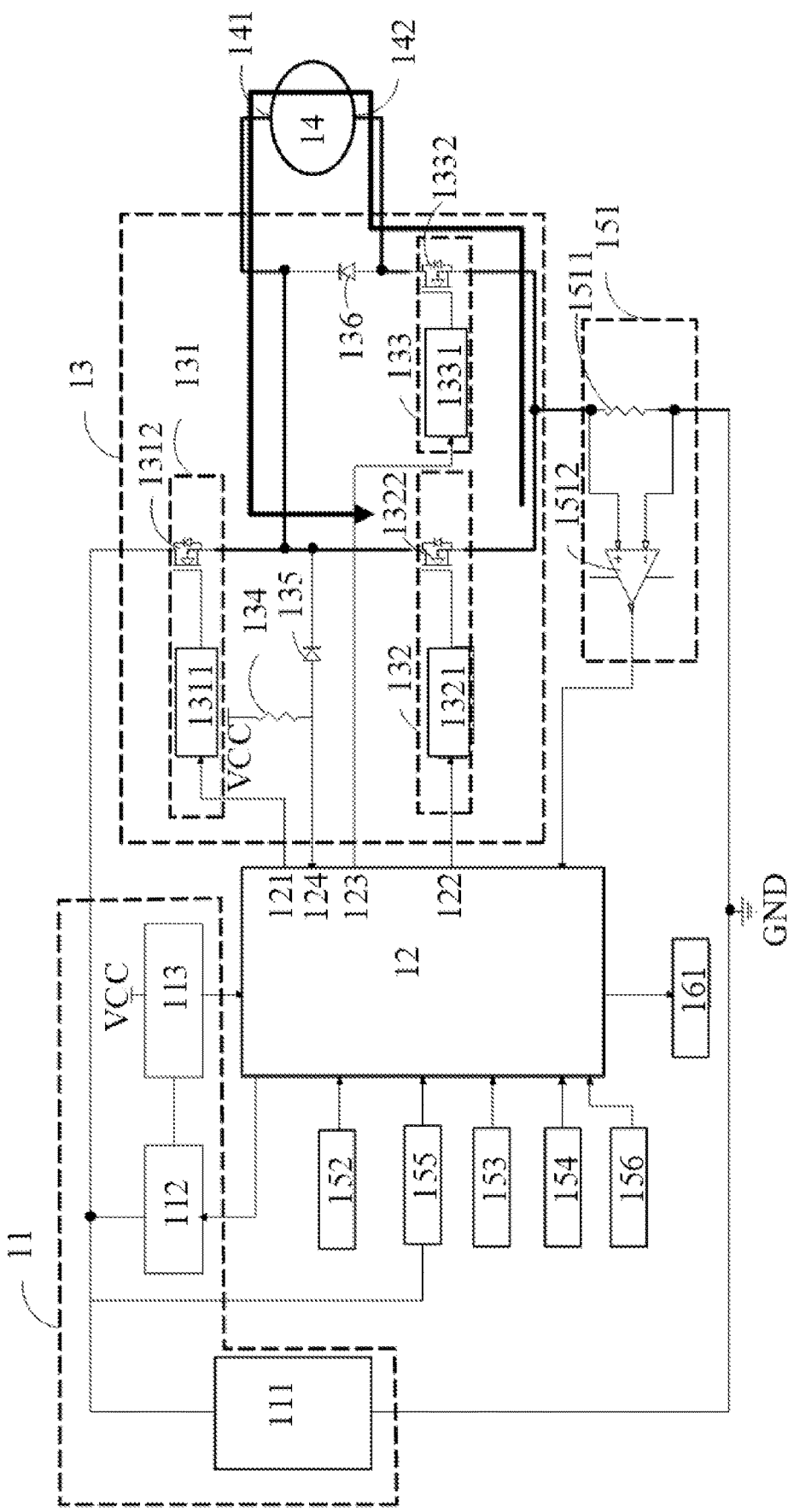
FIG. 4 is a second implementation schematic diagram of the power tool and the safety control circuit module thereof according to one embodiment of the present invention.
Figure 5:
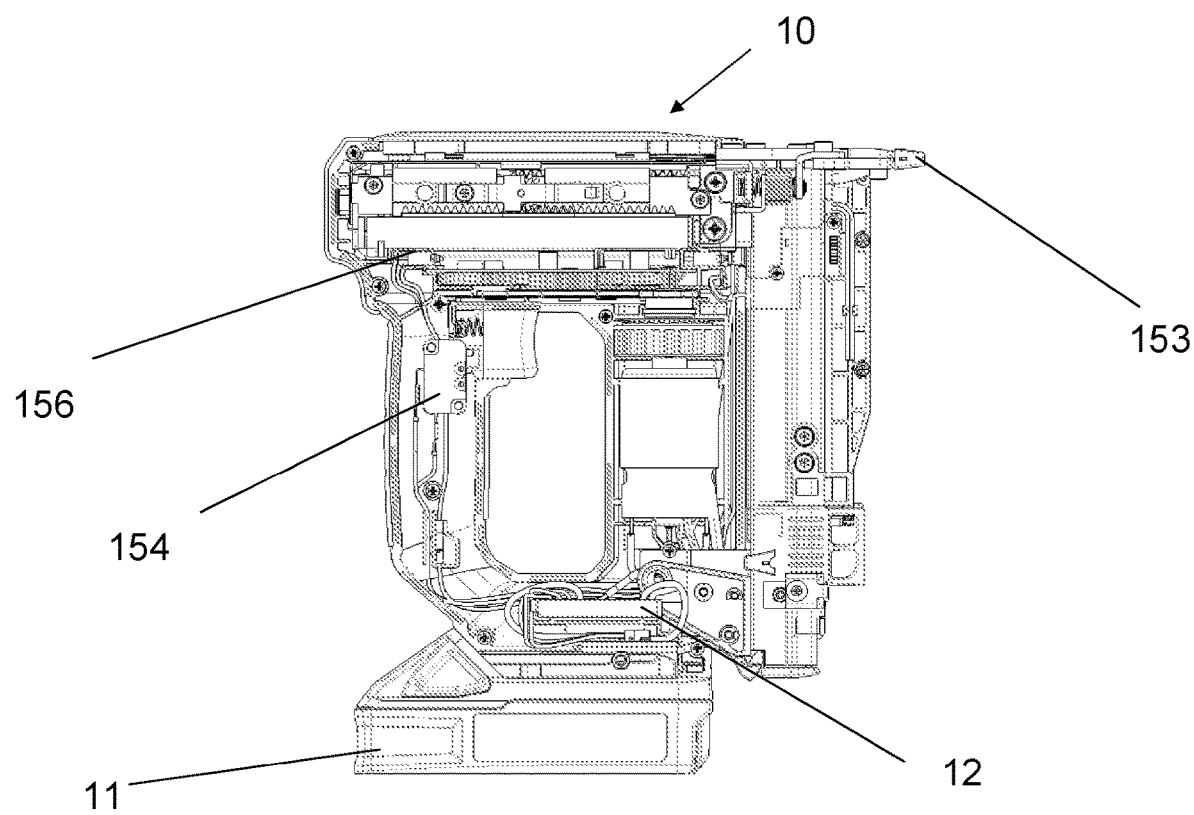
FIG. 5 is the power tool according to one embodiment of the present invention.

Furthermore, as illustrated in FIG. 2 to FIG. 4, the first switch control circuit 131 includes a first gate electrode, a first source electrode, and a first drain electrode. The second switch control circuit 132 includes a second gate electrode, a second source electrode, and a second drain electrode. The third switch control circuit 133 includes a third gate electrode, a third source electrode, and a third drain electrode. The first drain electrode is electrically connected to the power supply device 11. The first source electrode is electrically connected to the second drain electrode and the first power connection terminal 141. The second source electrode is electrically connected to the third source electrode. The third drain electrode is electrically connected to the second power connection terminal. The first driving circuit 1311 is electrically connected to the first gate electrode and the first switch signal output pin 121 to receive the first switch signal to allow the first switch unit 1312 to be turned on. The second driving circuit 1321 is electrically connected to the second gate electrode and the second switch signal output pin 122 to receive the second switch signal to allow the second switch unit 1322 to be turned on. The third driving circuit 1331 is electrically connected to the third gate electrode and the third switch signal output pin 123 to receive the third switch signal to allow the third switch unit 1332 to be turned on. The first diode 135 includes a first anode and a first cathode. The first anode is electrically connected to the examination signal input pin 124 and the first resistor 134, and the first cathode is electrically connected to the first source electrode and the second drain electrode. The safety control circuit module 13 further includes a second diode 136. The second diode 136 can include a second anode and a second cathode. The second cathode is electrically connected to the first source electrode and the first power connection terminal 141. The second anode is electrically connected to the third drain electrode and the second power connection terminal 142.

In one embodiment, when the first switch signal, the second switch signal, and the third switch signal are not outputted by the control processing device 12 through the first switch signal output pin 121, the second switch signal output pin 122, and the third switch signal output pin 123, the first switch unit 1312, the second switch unit 1322, and the third switch unit 1332 are not turned on, and an examination signal is received by the examination signal input pin 124; when the first switch signal, the second switch signal, and the third switch signal are not outputted by the control processing device 12 through the first switch signal output pin 121, the second switch signal output pin 122, and the third switch signal output pin 123, but the second switch unit 1322 or the third switch unit 1332 is turned on, an abnormal signal having an electric potential lower than the examination signal is received by the examination signal input pin 124.

In one embodiment, the power supply device 11 provides electric energy to the control processing device 12 and the power output device 14. As the first switch unit 1312 and the third switch unit 1332 are turned on, and the second switch unit 1322 is not turned on, an electric current of the electric energy flows from the first switch unit 1312 to the third switch unit 1332 through the power output device 14, and a motor of the power output device 14 operates.

In one embodiment, the motor is a direct-current motor. When the motor operates, if the second switch unit 1322 and the third switch unit 1322 are turned on, and the first switch unit 1312 is not turned on, a braking current of a counter electromotive force generated during operation of the motor flows from the third switch unit 1332 to the second switch unit 1322 through the power output device 14, and the motor is decelerated.

Furthermore, a turned-on time of the second switch unit 1322 and the third switch unit 1332 can be determined by the second switch signal and the third switch signal sent from the control processing device 12. For example, the turned-on time of the second switch unit 1322 and the third switch unit 1332 can be determined by high electric-potential duration of the second switch signal and the third switch signal.

In one embodiment, except for the first switch signal output pin 121, the second switch signal output pin 122, the third switch signal output pin 123, and the examination signal input pin 124, the control processing device 12 can further include a plurality of detection pins and a plurality of function output pins, and each of the detection pins is electrically connected to a plurality of detection units and a plurality of functional units respectively.

For example, the plurality of detection units can include a nail-lock detection switch 152, a safety switch 153, a trigger switch 154, a battery voltage detection unit 155, and an upper dead point switch 156, and the plurality of functional units include a light control unit 161. In one embodiment, the safety switch 153, the trigger switch 154, and the upper dead point switch 156 can include micro switches to detect a position of a firing pin. The nail-lock detection switch 152 can detect stock of nails to determine whether the nails can be fired. The light control unit 161 can control indicator lights and other lights to show a state of the power tool 10.

In one embodiment, the control processing device 12 includes a microprocessor. The microprocessor is a core of the control processing device 12 and has functions such as digital/analog conversion, input/output detection, communication transmission, pulse width modulation output, etc.

In one embodiment, after the power tool 10 is connected to the power supply device 11, the voltage of the battery 111 of the power supply device 11 is supplied to the microprocessor through a voltage-down circuit of the voltage regulator 113. After the microprocessor gets the electric energy, it sends a signal to the power switch 112 to maintain supplying the electric energy. Then, the microprocessor detects the nail-lock detection switch 152, the safety switch 153, and the trigger switch 154 in a polling manner, detects states of the first switch unit 1312, the second switch unit 1322, and the third switch unit 1332, and detects a voltage and an electric current of the motor by an analog-to-digital manner.

In one embodiment, the power tool 10 further includes a motor detection circuit 151. One terminal of the motor detection circuit 151 is electrically connected to the second switch control circuit 132 and the third switch control circuit 133, and another terminal of the motor detection circuit 151 is electrically connected to one of the plurality of detection pins. Furthermore, the motor detection circuit 151 includes a divider resistor 1511 and an amplifier 1512. The microprocessor can detect whether the electric current or the voltage of the motor is abnormal by the motor detection circuit 151.

Taking the power tool 10 as the electric nail gun as an example, the safety control method of the power tool 10 can further include the following processes. The microprocessor detects and determines that if a user turns on the safety switch 153 and the trigger switch 154 in sequence, and then checks whether the nail-lock detection switch 152 is normal. If the nail-lock detection switch 152 is in a normal state, then the electric nail gun enters into a fire state.

After entering into the fire state, the microprocessor checks states of each switch unit. In a normal situation, when the second switch unit 1322 and the third switch unit 1332 are not turned on, the microprocessor receives the examination signal having high electric potential, which means states of the second switch unit 1322 and the third switch unit 1332 are normal. Then, the microprocessor can send the first switch signal and the third switch signal, and turn on the first switch unit 1312 and the third switch unit 1332 through the first driving circuit 1311 and the third driving circuit 1331 to start and operate the motor.

After the motor starts to operate, it lifts the firing pin up and passes the upper dead point switch 156. After the microprocessor detects the state of the upper dead point switch 156, it determines a stopping time of the motor according to the voltage of the battery 111. When a stop time is reached, the microprocessor stops sending the first switch signal of high potential to turn off the first switch unit 1312, and sends the second switch signal to turn on the second switch unit 1322, causing the motor to brake and stop quickly. In addition, the braking time of the motor can be controlled by the microprocessor.

However, if the power tool 10 enters the fire state, but the second switch unit 1322 and the third switch unit 1332 are not turned on, and the microprocessor receives an abnormal signal having low electric potential, which means at least one of the second switch unit 1322 or the third switch unit 1332 has failed. At this time, an abnormal mode is entered, and the motor is not operated.

The present invention further provides a safety control circuit module 13. The safety control circuit module 13 can be disposed in the power tool 10. The power tool 10 of the present invention can be an electric nail gun, but is not limited thereto. As long as the safety control circuit module 13 of the present invention can be installed, it should be included in the scope of the present invention. The safety control circuit module 13 can include a first switch control circuit 131, a second switch control circuit 132, a third switch control circuit 133, a first resistor 134, and a first diode 135.

The first switch control circuit 131 is electrically connected to a first switch signal output pin 121 of a control processing device 12 of the power tool 10 and receives a first switch signal from the control processing device 12. A second switch control circuit 132 is electrically connected to a second switch signal output pin 122 of the control processing device 12 and the first switch control circuit 131 and receives a second switch signal from the control processing device 12. A third switch control circuit 133 is electrically connected to a third switch signal output pin 123 of the control processing device 12 and the second switch control circuit 132 and receives a third switch signal from the control processing device 12. The first resistor 134 is electrically connected to a power supply device 11 of the power tool 10. The first diode 135 is electrically connected to an examination signal input pin 124 of the control processing device 12 and the first resistor 134.

In one embodiment, the safety control circuit module 13 is connected to the power output device 14 of the power tool 10. The power output device 14 includes a first power connection terminal 141 and a second power connection terminal 142. The first power connection terminal 141 is electrically connected to the first switch control circuit 131, the first diode 135, and the second switch control circuit 132. The second power connection terminal 142 is electrically connected to the third switch control circuit 133.

Furthermore, in one embodiment, the first switch control circuit 131 includes a first driving circuit 1311 and a first switch unit 1312; the second switch control circuit 132 includes a second driving circuit 1321 and a second switch unit 1322; and the third switch control circuit 133 includes a third driving circuit 1331 and a third switch unit 1332.

In one embodiment, the first switch unit 1312, the second switch unit 1322, and the third switch unit 1332 are metal-oxide-semiconductor field-effect transistors, and preferably, they can be N-type metal-oxide-semiconductor field-effect transistors.

Furthermore, as illustrated in FIG. 2 to FIG. 4, the first switch control circuit 131 includes a first gate electrode, a first source electrode, and a first drain electrode. The second switch control circuit 132 includes a second gate electrode, a second source electrode, and a second drain electrode. The third switch control circuit 133 includes a third gate electrode, a third source electrode, and a third drain electrode. The first drain electrode is electrically connected to the power supply device 11. The first source electrode is electrically connected to the second drain electrode and the first power connection terminal 141. The second source electrode is electrically connected to the third source electrode. The third drain electrode is electrically connected to the second power connection terminal. The first driving circuit 1311 is electrically connected to the first gate electrode and the first switch signal output pin 121 to receive the first switch signal to allow the first switch unit 1312 to be turned on. The second driving circuit 1321 is electrically connected to the second gate electrode and the second switch signal output pin 122 to receive the second switch signal to allow the second switch unit 1322 to be turned on. The third driving circuit 1331 is electrically connected to the third gate electrode and the third switch signal output pin 123 to receive the third switch signal to allow the third switch unit 1332 to be turned on. The first diode 135 includes a first anode and a first cathode. The first anode is electrically connected to the examination signal input pin 124 and the first resistor 134, and the first cathode is electrically connected to the first source electrode and the second drain electrode. The safety control circuit module 13 further includes a second diode 136. The second diode 136 can include a second anode and a second cathode. The second cathode is electrically connected to the first source electrode and the first power connection terminal 141. The second anode is electrically connected to the third drain electrode and the second power connection terminal 142.

In one embodiment, when the first switch signal, the second switch signal, and the third switch signal are not outputted by the control processing device 12 through the first switch signal output pin 121, the second switch signal output pin 122, and the third switch signal output pin 123, the first switch unit 1312, the second switch unit 1322, and the third switch unit 1332 are not turned on, and an examination signal is received by the examination signal input pin 124; when the first switch signal, the second switch signal, and the third switch signal are not outputted by the control processing device 12 through the first switch signal output pin 121, the second switch signal output pin 122, and the third switch signal output pin 123, but the second switch unit 1322 or the third switch unit 1332 is turned on, an abnormal signal having an electric potential lower than the examination signal is received by the examination signal input pin 124.

In one embodiment, the control processing device 12 includes a microprocessor. The microprocessor is a core of the control processing device 12 and has functions such as digital/analog conversion, input/output detection, communication transmission, pulse width modulation output, etc. The microprocessor can detect whether the connected device connected thereto is abnormal by a polling manner.

Furthermore, taking the power tool 10 as an electric nail gun as an example, the power tool 10 can be operated by the following processes. Turning on the safety switch 153 first; then turning on the trigger switch 154; and then the microprocessor checks whether the nail-lock detection switch 152 is normal. If the nail-lock detection switch 152 is in a normal state, then the electric nail gun enters into a fire state.

After entering into the fire state, the microprocessor checks states of each switch unit. In a normal situation, when the second switch unit 1322 and the third switch unit 1332 are not turned on, the microprocessor receives the examination signal having high electric potential, which means states of the second switch unit 1322 and the third switch unit 1332 are normal. Then, the microprocessor can send the first switch signal and the third switch signal, and turns on the first switch unit 1312 and the third switch unit 1332 through the first driving circuit 1311 and the third driving circuit 1331 to start and operate the motor.

After the motor starts to operate, it lifts the firing pin up and passes the upper dead point switch 156. After the microprocessor detects the state of the upper dead point switch 156, it determines a stopping time of the motor according to the voltage of the battery 111. When the stop time is reached, the microprocessor stops sending the first switch signal of high potential to turn off the first switch unit 1312, and sends the second switch signal to turn on the second switch unit 1322, causing the motor to brake and stop quickly. In addition, the braking time of the motor can be controlled by the microprocessor.

However, if the power tool 10 enters the firing state, but the second switch unit 1322 and the third switch unit 1332 are not turned on, and the microprocessor receives an abnormal signal having low electric potential, which means at least one of the second switch unit 1322 or the third switch unit 1332 has failed. At this time, an abnormal mode is entered, and the motor is not operated.

In one embodiment, the present invention further provides a safety control method of the power tool, including:

providing electric energy to actuate the control processing device 12 by the power supply device 11;

detecting states of the trigger switch 154 and the safety switch 153 by the control processing device 12, wherein if the control processing device 12 detects that the safety switch 153 and the trigger switch 154 are in an actuation state and if the safety switch 153 is actuated first corresponding to the trigger switch 154, the safety control method further includes:

making the first switch control circuit 131 to be invalid by the control processing device 12, wherein the electric energy is unable to be transmitted to a second switch control circuit 132, a third switch control circuit 133, and a power output device 14 at this time;

making the second switch control circuit 132 and the third switch control circuit 133 to be invalid by the control processing device 12; and detecting an electric potential of the second switch control circuit 132 and the third switch control circuit 133 by a detecting signal input pin 124.

If the electric potential is a low electric potential, the control processing device 12 determines that at least one of the second switch control circuit 132 and the third switch control circuit 133 has failed and does not allow the electric energy of the power supply device 11 to be transmitted to the power output device 14.

Therefore, by the aforesaid configuration, the power tool, and the safety control circuit module and the safety control method thereof provided by the present invention can prevent a phenomenon that the motor of the power output device keeps running after any switch unit is burned out, and the control processing device cannot control it. In the present invention, before the switch unit is controlled, the control processing device is used to detect whether the switch unit has been failed, so that safety can be improved.

The above are only examples, but are not for restriction. Any equivalent modifications or changes that do not depart from the spirit and scope of the present invention should be included in the scope of the claims.

What is claimed is:

1. A power tool, comprising:
a power supply device;
a control processing device electrically connected to the power supply device and comprising a first switch signal output pin, a second switch signal output pin, third switch signal output pin, and an examination signal input pin, wherein a first switch signal, a second switch signal, and a third switch signal are respectively outputted from the control processing device by the first switch signal output pin, the second switch signal output pin, and the third switch signal output pin;

a safety control circuit module comprising
a first switch control circuit electrically connected to the first switch signal output pin;
a second switch control circuit electrically connected to the second switch signal output pin and the first switch control circuit;
a third switch control circuit electrically connected to the third switch signal output pin and the second switch control circuit;
a first resistor electrically connected to the power supply device; and
a first diode electrically connected to the examination signal input pin and the first resistor; and
a power output device comprising:
a first power connection terminal electrically connected to the first switch control circuit, the first diode, and the second switch control circuit; and
a second power connection terminal electrically connected to the third switch control circuit.

2. The power tool as claimed in claim 1, wherein
the first switch control circuit comprises a first driving circuit and a first switch unit;
the second switch control circuit comprises a second driving circuit and a second switch unit;
the third switch control circuit comprises a third driving circuit and a third switch unit;
the first switch unit, the second switch unit, and the third switch unit are metal-oxide-semiconductor field-effect transistors;
the first switch control circuit comprises a first gate electrode, a first source electrode, and a first drain electrode; the second switch control circuit comprises a second gate electrode, a second source electrode, and a second drain electrode; the third switch control circuit comprises a third gate electrode, a third source electrode, and a third drain electrode; the first drain electrode is electrically connected to the power supply device, the first source electrode is electrically connected to the second drain electrode and the first power connection terminal, the second source electrode is electrically connected to the third source electrode, and the third drain electrode is electrically connected to the second power connection terminal;
the first driving circuit is electrically connected to the first gate electrode and the first switch signal output pin and receives the first switch signal to allow the first switch unit to be turned on;
the second driving circuit is electrically connected to the second gate electrode and the second switch signal output pin and receives the second switch signal to allow the second switch unit to be turned on;
the third driving circuit is electrically connected to the third gate electrode and the third switch signal output pin and receives the third switch signal to allow the third switch unit to be turned on; and
the first diode comprises a first anode and a first cathode, the first anode is electrically connected to the examination signal input pin and the first resistor, and the first cathode is electrically connected to the first source electrode and the second drain electrode.

3. The power tool as claimed in claim 2, wherein the safety control circuit module further comprises a second diode, the second diode comprises a second anode and a second cathode, the second cathode is electrically connected to the first source electrode and the first power connection terminal, and the second anode is electrically connected to the third drain electrode and the second power connection terminal.

4. The power tool as claimed in claim 2, wherein when the first switch signal, the second switch signal, and the third switch signal are not outputted by the control processing device through the first switch signal output pin, the second switch signal output pin, and the third switch signal output pin, the first switch unit, the second switch unit, and the third switch unit are not turned on, and an examination signal is received by the examination signal input pin.

5. The power tool as claimed in claim 4, wherein when the first switch signal, the second switch signal, and the third switch signal are not outputted by the control processing device through the first switch signal output pin, the second switch signal output pin, and the third switch signal output pin, but the second switch unit or the third switch unit is turned on, an abnormal signal having an electric potential lower than the examination signal is received by the examination signal input pin.

6. The power tool as claimed in claim 2, wherein the power supply device provides electric energy to the control processing device and the power output device;
when the first switch unit and the third switch unit are turned on, an electric current of the electric energy flows from the first switch unit to the third switch unit through the power output device, and a motor of the power output device operates; when the motor operates, if the second switch unit and the third switch unit are turned on, and the first switch unit is not turned on, a braking current of a counter electromotive force generated during operation of the motor flows from the third switch unit to the second switch unit through the power output device, and the motor is decelerated; and
a turned-on time of the second switch unit and the third switch unit is determined by the second switch signal and the third switch signal sent from the control processing device.

7. The power tool as claimed in claim 1, wherein the control processing device further comprises a plurality of detection pins, and each of the detection pins is electrically connected to a plurality of detection units respectively.

8. The power tool as claimed in claim 7, wherein the power tool further comprises a motor detection circuit, one terminal of the motor detection circuit is electrically connected to the second switch control circuit and the third switch control circuit, and another terminal of the motor detection circuit is electrically connected to one of the plurality of detection pins.

9. The power tool as claimed in claim 7, wherein the plurality of detection units comprise a trigger switch and a safety switch.

10. A safety control circuit module disposed in a power tool, comprising:
a first switch control circuit electrically connected to a first switch signal output pin of a control processing device of the power tool and receiving a first switch signal from the control processing device;
a second switch control circuit electrically connected to a second switch signal output pin of the control processing device and the first switch control circuit and receiving a second switch signal from the control processing device;
a third switch control circuit electrically connected to a third switch signal output pin of the control processing device and the second switch control circuit and receiving a third switch signal from the control processing device;
a first resistor electrically connected to a power supply device of the power tool; and
a first diode electrically connected to an examination signal input pin of the control processing device and the first resistor,
wherein the safety control circuit module is connected to a power output device of the power tool, the power output device comprises a first power connection terminal and a second power connection terminal, the first power connection terminal is electrically connected to the first switch control circuit, the first diode, and the second switch control circuit, and the second power connection terminal is electrically connected to the third switch control circuit.

11. The safety control circuit module as claimed in claim 10, wherein
the first switch control circuit comprises a first driving circuit and a first switch unit;
the second switch control circuit comprises a second driving circuit and a second switch unit;
the third switch control circuit comprises a third driving circuit and a third switch unit; the first switch unit, the second switch unit, and the third switch unit are metal-oxide-semiconductor field-effect transistors;
the first switch control circuit comprises a first gate electrode, a first source electrode, and a first drain electrode;
the second switch control circuit comprises a second gate electrode, a second source electrode, and a second drain electrode;
the third switch control circuit comprises a third gate electrode, a third source electrode, and a third drain electrode;
the first drain electrode is electrically connected to the power supply device, the first source electrode is electrically connected to the second drain electrode and the first power connection terminal, the second source electrode is electrically connected to the third source electrode, and the third drain electrode is electrically connected to the second power connection terminal;
the first driving circuit is electrically connected to the first gate electrode and the first switch signal output pin and receives the first switch signal to allow the first switch unit to be turned on;
the second driving circuit is electrically connected to the second gate electrode and the second switch signal output pin and receives the second switch signal to allow the second switch unit to be turned on;
the third driving circuit is electrically connected to the third gate electrode and the third switch signal output pin and receives the third switch signal to allow the third switch unit to be turned on; and
the first diode comprises a first anode and a first cathode, the first anode is electrically connected to the examination signal input pin and the first resistor, and the first cathode is electrically connected to the first source electrode and the second drain electrode.

12. The safety control circuit module as claimed in claim 11, wherein the safety control circuit module further comprises a second diode, the second diode comprises a second anode and a second cathode, the second cathode is electrically connected to the first source electrode and the first power connection terminal, and the second anode is electrically connected to the third drain electrode and the second power connection terminal.

13. The safety control circuit module as claimed in claim 11, wherein
when the first switch signal, the second switch signal, and the third switch signal are not outputted by the control processing device through the first switch signal output pin, the second switch signal output pin, and the third switch signal output pin, the first switch unit, the second switch unit, and the third switch unit are not turned on, and an examination signal having a high electric potential is received by the examination signal input pin;
when the first switch signal, the second switch signal, and the third switch signal are not outputted by the control processing device through the first switch signal output pin, the second switch signal output pin, and the third switch signal output pin, but the second switch unit or the third switch unit is turned on, an abnormal signal having an electric potential lower than the examination signal is received by the examination signal input pin.

14. A safety control method of a power tool, comprising:
providing electric energy to actuate a control processing device by a power supply device;
detecting states of a trigger switch and a safety switch and by the control processing device,
wherein if the control processing device detects that the safety switch and the trigger switch are in an actuation state and if the safety switch is actuated corresponding to the trigger switch, the safety control method further comprise:
making the first switch control circuit to be invalid by the control processing device,
wherein the electric energy is unable to be transmitted to a second switch control circuit, a third switch control circuit, and a power output device at this time;
making the second switch control circuit and the third switch control circuit to be invalid by the control processing device; and detecting an electric potential of the second switch control circuit and the third switch control circuit by a detecting signal input pin,
wherein if the electric potential is a low electric potential, the control processing device determines that at least one of the second switch control circuit and the third switch control circuit has failed and does not allow the electric energy of the power supply device to be transmitted to the power output device.

* * * * *